United States Patent [19]

Hirco

[11] 3,787,120

[45] Jan. 22, 1974

[54] APPARATUS FOR ATOMIC ABSORPTION SPECTROPHOTOMETRY

[75] Inventor: Bernard Hircq, Arpajon, France

[73] Assignee: Commissariat A L'Energie Atomique, Paris, France

[22] Filed: Feb. 2, 1972

[21] Appl. No.: 222,734

[30] Foreign Application Priority Data

Feb. 8, 1971 France .............................. 7104146

[52] U.S. Cl. .................... 356/85, 356/244, 356/246
[51] Int. Cl. ............................ G01j 3/02, G01j 3/42
[58] Field of Search ...................... 356/85–87, 244, 356/246

[56] References Cited
UNITED STATES PATENTS 3,381,571   5/1968   Vallee et al. ...................... 356/87 X
3,591,289   7/1971   Donega et al. ........................ 356/85

OTHER PUBLICATIONS

Alder et al., "Analytica Chimica Acta", Vol. 51, No. 3, September 1970, pages 365–372.
Brandenberger; "Empfindlichkeitssteigerung der atomaren Absorptionsanalyse mittels flammenloser Atomisierung", Chimia, Vol. 22, No. 12, 1968, pages 449–459.
West et al.; "Atomic Absortion and Fluorescence Spectroscopy with a Carbon Filament Atom Reservoir", Analytica Chimica Acta, Vol. 45, March 1969, pages 27–41.

Primary Examiner—Ronald L. Wibert
Assistant Examiner—F. L. Evans
Attorney, Agent, or Firm—Joseph M. Lane et al.

[57] ABSTRACT

The apparatus is of the atom-generating filament type and comprises a T-shaped tubular cell, the rectilineal tube at the top of the T being traversed by a light beam whilst the central stem of the T is a tube containing the filament. A cell-holder contains the rectilineal tube which is optically open at its two opposite extremities, and a cap unit containing the central tube together with a filament of adjustable height is screwed onto the cell-holder. A rare or inert gas is introduced through the central tube in order to permit continuous sweeping with a stream having a constant flow which passes through the filament and is discharged to free air through the extremities of the rectilineal tube.

9 Claims, 5 Drawing Figures

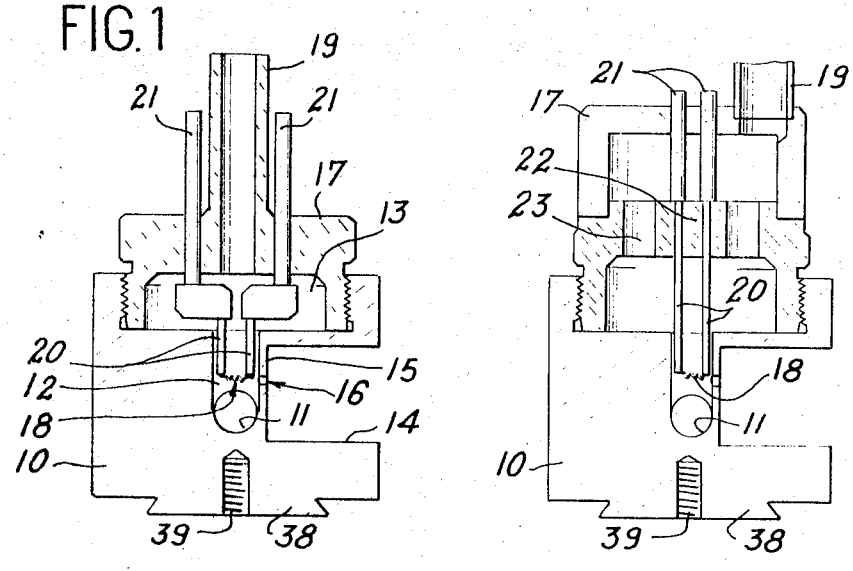
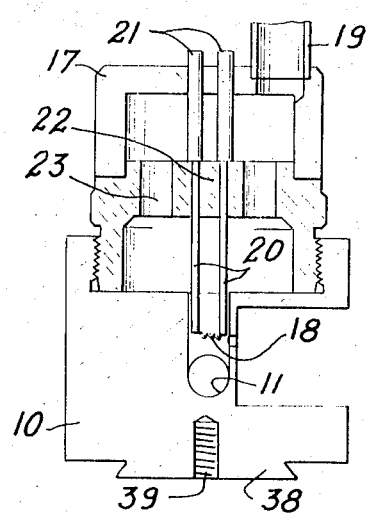
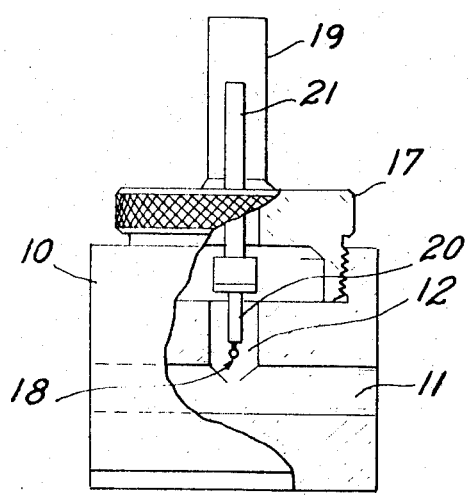
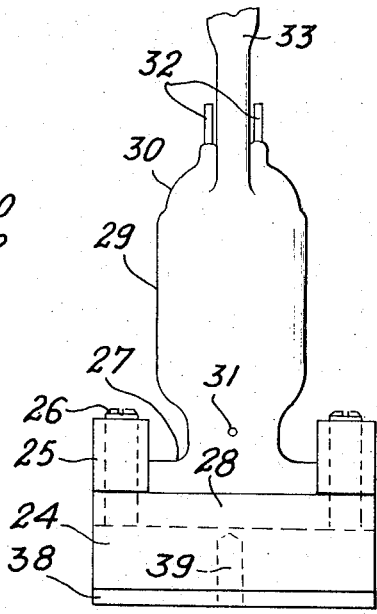
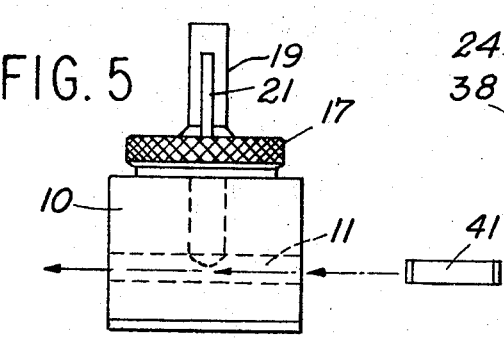

APPARATUS FOR ATOMIC ABSORPTION SPECTROPHOTOMETRY

This invention relates to an apparatus for atomic absorption spectrophotometry.

The detection and measurement of trace quantities of elements by atomic absorption spectrophotometry is a known technique. The method employed consists in making use of a starting solution for the production of atoms in the neutral state which absorb a monochromatic radiation; this absorption is governed by the Beer-Lambert law which states in the following formula that:

$$\log I_0/I = k \, l \, c$$

in which:

$I_0$ is the intensity of the incident radiation,
$I$ is the intensity of the same radiation after absorption,
$k$ is a constant,
$l$ is the length of the absorbing path and
$c$ is the concentration of atoms on the absorbing path.

On the basis of this principle, a number of different types of apparatus has been proposed up to the present time for determining traces of elements after calibration.

Use can be made of a flame which is placed on the optical path of the light beam and into which is sprayed the solution containing the element to be determined. However, the objection to these devices is the fact that they entail a high consumption of the sample of solution, that they have a low degree of sensitivity in the case of certain elements and further require special measures for ensuring safety and removal of heat.

In other types of apparatus, the sample is placed in a graphite tube furnace which is traversed by the light beam and swept by a stream of argon gas; the element is vaporized by increasing the ohmic heating. These devices are endowed with high sensitivity but exhibit excessive inertia at the time of increase in temperature and give rise to emission phenomena; they are of fairly large overall size and entail high capital expenditure.

Devices for vaporizing the injected solution on a heated filament are also known and operate in a closed tubular enclosure: the light beam travels across the enclosure through two quartz windows; the carbon filament is placed in the vicinity of the optical path and the measurements are carried out in a static argon atmosphere. These devices are subject to very numerous disadvantages: substantial bulk, high reduction of light energy by the quartz windows, the need to remove traces of oxygen from the enclosure before each measurement is taken, lack of sensitivity and of reproducibility as a result of dispersion of the atomic cloud, the risk of disturbance of the measurements by a light emission produced by the filament, risks of contamination by condensation of the atoms on the quartz faces and the supports of the filament. Such devices are better suited to atomic fluorescence spectroscopy.

This invention relates to another filament-type apparatus which is not subject to the disadvantages of the flame or furnace devices, and is also very well suited to atomic absorption spectroscopy by virtue of its high sensitivity, its high fidelity and the possibility of carrying out a whole series of measurements.

More specifically, the invention is directed to an apparatus of the atom-generating filament type for atomic absorption spectrophotometry, which essentially comprises a T-shaped tubular cell, the rectilineal tube at the top of the T being traversed by a light beam whilst the central stem of the T is a tube which contains the filament. The apparatus is characterized in that a cell-holder contains said rectilineal tube which is optically open at the two opposite extremities thereof, a cap unit containing said central tube with a filament of adjustable height is assembled with the cell-holder, a rare or inert gas is introduced through the central tube in order to permit continuous sweeping with a stream having a constant flow which passes through the filament and is discharged to free air through said extremities of the rectilineal tube.

Further properties and advantages of the present invention will be brought out by the following description with reference to the accompanying drawings, in which three embodiments of the invention are given by way of explanation but not in any limiting sense.

It will be assumed in this description that the T-shaped cell is mounted in the inverted position within each apparatus.

In these drawings,

FIG. 1 is a sectional view, taken transversely to the T-cell, of an apparatus with central admission of gas and metallic filament;

FIG. 2 is an alternative form of FIG. 1 with lateral admission of the gas;

FIG. 3 is a view in elevation of an alternative embodiment of said apparatus with carbon filament;

FIG. 4 is a view in sectional elevation of the apparatus according to the invention;

FIG. 5 is a view in elevation of the apparatus of FIGS. 1 and 4 with a light source arranged to transmit a monochromatic light beam through the T-cell.

As illustrated in FIGS. 1 and 4, the apparatus is constituted by two small units, namely a cell-holder and a cap, which are assembled together by screwing.

The cell-holder 10 is molded in a single piece, especially of "Plexiglas" or of glass; the T-cell comprises a rectilineal tube 11 which is optically open at both extremities, on two opposite walls of the cell-holder, in order to provide a passageway for the monochromatic light beam employed; the top portion of the central tube 12 of the T has its opening at the bottom and at the center of the cavity 13 into which the cap unit is screwed. The cell-holder is recessed at 14 in such manner as to ensure that the wall 15 is of small thickness in comparison with the cell and is pierced within the recessed portion by a small orifice 16 which opens into the tube 12; this arrangement permits the ready insertion of a micro-syringe which serves to inject each small quantity of solution containing an element to be determined.

The cap unit 17 which is screwed into the cavity 13 of the cell-holder serves to support both the metallic filament 18 and the central connector-tube 19 for the admission of gas, which is usually argon. The filament 18 is attached directly between the extremities of the current-supply electrodes 20 formed of tungsten; the complete assembly can be adjusted for height by means of the two brass rods 21 which are provided with a fine screw-thread and extend through the top of the cap unit on each side of the connector-tube 19. The height adjustment referred-to consists in bringing the filament 18 exactly opposite to the orifice 16 in order that each small quantity of solution under analysis may be deposited on said filament by the micro-syringe.

As shown in FIG. 5, a light source 41 is arranged to transmit a monochromatic light beam through the rectilinear tube 11.

In the apparatus of FIG. 2, the cell-holder 10 is identical with that of FIGS. 1 and 4 except for the fact that the gas-admission tube 19 is displaced to one side of the cap unit 17; the two threaded rods 21 are in that case mounted at the center of the cap unit and are directly extended by the electrodes 20 which pass through an intermediate wall 22 pierced by four lateral holes 23 for the distributed circulation of the gas.

The cap unit is also obtained by molding with its accessories and can be formed of "Plexiglas" in the case of a metallic filament. When the temperature to be attained by the filament is of a high order, the "Plexiglas" is replaced by a glass. This is the case, for example, with the apparatus of FIG. 3.

In this last-mentioned apparatus, the cell-holder can be formed in two parts 24 and 25 which are assembled together by means of screws 26 so as to clamp between them the rectilineal tube 28 of the T-shaped cell 27; the central tube 29 of the T is widened-out towards the top so as to accommodate the cap 30 which is fitted in position by closure with emery; the orifice through which the needle of the micro-syringe is inserted is shown at 31.

The cell-holder is of "Plexiglas" but the T-cell and cap unit are both of glass. This apparatus comprises a carbon filament which is supported by two tungsten rods 32 on each side of the central connector-tube 33 for the admission of argon or like gas.

Regardless of the design adopted, the apparatus can be mounted on a support (not shown in the drawings) comprising a carriage actuated by a micrometric screw with control knob. The apparatus according to the invention is mounted on the carriage, the displacements of said carriage and consequently of the apparatus being controlled by a vernier. This assembly makes it possible to place the axis of symmetry of the cell in coincidence with the focal plane of the optical system, which is important for the sensitivity and reproducibility of measurements.

This arrangement is practical but not exclusive inasmuch as the same adjustment could be achieved by maintaining the apparatus stationary, in which case the position of the light source would be adjustable relative to the axis of the rectilineal tube of the T-cell.

The performance of a measurement, that is to say the determination of trace constituents of any given element, takes place under the following conditions:

The type of cell and in particular a metal or carbon filament cell, is selected as a function of the nature of the element to be determined and of the matrix under analysis; this choice takes into account the lower thermal inertia of a metallic filament which makes it possible to carry out rapidly a series of measurements whilst the carbon filament carried by tungsten rods permits the attainment of high temperatures up to 2,800°C.

The dimensional characteristics of the filaments are as follows:
- metal: 8 mm in length, 0.5 mm in width and 50 $\mu$ in thickness,
- carbon: 10 mm in length and 1 mm in diameter.

The maximum power consumption is of the order of 500 W at a voltage of up to 10 v which can in any case be adjustable, that is to say a current intensity which does not exceed 50 amps.

Assuming that the apparatus is mounted on the support described above, the initial operation consists in making use of the vernier in order to place the vertical axis of symmetry of the cell in coincidence with the focal plane of the monochromatic light beam which is characteristic of the element to be determined and which passes through the rectilineal tube of the T-cell. The needle of the micro-syringe containing the small quantity of solution of the element to be determined is then inserted into the orifice which is provided for this purpose and which has a diameter of the order of 1 millimeter. Deposition of this solution on the filament is then carried out, the height of said filament having previously been adjusted as indicated earlier: the quantity required is very small and varies from one-half to a few microliters. Sweeping of the cell with a stream of either inert or rare gas is then initiated, the gas flow being adjustable and maintained strictly constant throughout the measurement by means of a triple expansion of the gas, so that no further admission of air is liable to take place.

After the removal of the micro-syringe, the filament is heated to a slight extent in order to cause only evaporation of the solvent, whereupon the deposit is subjected to pre-heating and, finally, the filament is brought to the requisite high temperature in a fraction of a second; the element to be determined is abruptly volatilized within the cell in the form of atomic vapor and is carried along and guided by the gas stream; the vapor cloud passes along the path of the monochromatic beam before being discharged to the exterior of the cell.

At the moment when the undispersed and very dense cloud passes through the focal plane, there takes place an absorption of light energy which results in a very sharp peak by recording of the signal as a function of time; the height of this peak is proportional to the quantity of elements deposited on the filament for a value of absorption which is lower than 30 percent. The Beer-Lambert law applies above this value (length of the absorbing path).

By reason of the fact that the measurements are carried out in a dynamic medium, and in spite of the very small quantity of sample consumed, the measurements are obtained with a very good absolute sensitivity and excellent reproducibility, which is not the case in a closed static medium. Cooling of the filament is practically instantaneous, which avoids the need for waiting periods when a large number of measurements are being performed. As a result of continuous sweeping with a constant gas flow up to the point of discharge from the cell to the atmosphere, there is not formed on the internal walls any deposit which would be liable to impair the following measurements, the cell being continuously in an inert atmosphere and the measurements being carried out in a continuous manner, which represents a substantial saving of time. Since the filament is outside the field of the monochromatic light beam, no disturbance of the measurements need be expected if this filament becomes temporarily luminous.

Since the consumption of electric power is of a low order, the apparatus requires only a conventional voltage generator and this in turn permits a complete installation at low capital cost. The overall size is very small and an apparatus of the type described can be adapted to all commercially available units by reason of its great ease of assembly.

This apparatus has a wide range of potential applications, as is apparent from the following observations:

a. — Determination of zinc, of cadmium and of magnesium.

Linear calibration curves which give the height of the peak have been prepared for quantities ranging from $10^{-13}$ to $10^{-9}$ g. The limit of detection corresponds to approximately $5 \times 10^{-14}$ g.

b. — Limits of detection of a few elements (in grams).

| Mercury | $2 \times 10^{-9}$ |
| Indium | $10^{-8}$ |
| Lead | $5 \times 10^{-10}$ |
| Rubidium | $10^{-10}$ |
| Copper | $2 \times 10^{-10}$ |
| Beryllium | $2 \times 10^{-11}$ |
| Silver | $10^{-11}$ |
| Gold | $7 \times 10^{-10}$ | c. — This apparatus makes it possible to carry out a determination of gold, zinc, cadmium, in the presence of the uranium matrix.

d. — If the filament is a grid which retains fine particles, the apparatus permits the analysis of impurities in a gas and is therefore applicable to monitoring of atmospheric pollution.

It is to be clearly understood that the present invention has been described above only by way of indication and not in any sense by way of limitation and that any modifications of detail could accordingly be made therein without departing from its scope.

What we claim is:

1. An apparatus of the atom-generation filament type for atomic absorption spectrometry comprising a cell holder defining a T-shaped tubular cell including a rectilinear tube and a central tube intersecting said rectilinear tube between its ends, said rectilinear tube being open at the opposite extremities thereof, means to transmit a light beam through said rectilinear tube, a filament, a cap unit assembled with said cell holder and supporting said filament in said central tube, and means for introducing an inert gas into said central tube to generate a stream passing through said central tube over said filament and out through the open extremities of said rectilinear tube to provide continuous sweeping of said T-shaped cell, said tubular cell being structured so that the gas flow out through both extremities of said rectilinear tube is equal.

2. An apparatus according to claim 1, wherein said cell-holder is one piece forming said T-shaped tubular cell within its mass.

3. An apparatus according to claim 1, wherein said cell-holder is formed of two parts assembled together by means of screws to define said T-shaped tubular cell.

4. An apparatus according to claim 1, wherein said central tube has an extremity distal from said rectilinear tube, said cap unit screws into a cylindrical cavity at said distal extremity of said central tube, said central tube communicating with said cavity at the center and at the bottom of said cavity.

5. An apparatus according to claim 1, wherein said filament is attached directly by means of tungsten rods to a support which is adjustable for height by means of two threaded rods passing through said cap unit.

6. An apparatus according to claim 1, wherein said means to introduce inert gas into said central tube comprises a gas admission tube located in the line of extension of said central tube.

7. An apparatus according to claim 4, wherein said means to introduce an inert gas into said central tube comprises a gas admission tube displaced laterally from the axis of said central tube and wherein a plurality of holes are uniformly disposed in an intermediate wall of said cap unit to distribute said inert gas from said gas admission tube into said central tube through said cavity, said intermediate wall being traversed at the center by means supporting said filament.

8. An apparatus according to claim 1, wherein said central tube is pierced by an orifice for the introduction of samples at the level of the filament.

9. An apparatus according to claim 1, wherein said means to transmit a light beam includes an optic system having a focal plane, the position of said focal plane and said cell being adjustable relative to each other in order that said focal plane may be superimposed on the axis of said central tube.

* * * * *